(12) United States Patent
Dalfors

(10) Patent No.: US 6,851,254 B1
(45) Date of Patent: Feb. 8, 2005

(54) SELF-CLEANING RAKE

(75) Inventor: Scott Marriott Dalfors, El Cajon, CA (US)

(73) Assignee: Falling Leaf Innovations, Inc., Coronado, CA (US)

( * ) Notice: Subject to any disclaimer, the term of this patent is extended or adjusted under 35 U.S.C. 154(b) by 0 days.

(21) Appl. No.: 10/761,859

(22) Filed: Jan. 20, 2004

(51) Int. Cl.$^7$ ................................................ A01D 7/10
(52) U.S. Cl. .................................. 56/400.08; 56/400.1
(58) Field of Search ........................ 56/400.01, 400.07, 56/400.08, 400.1, 400.14, 400.17, 40.21; 294/50.4–50.9

(56) References Cited

U.S. PATENT DOCUMENTS

| | | | |
|---|---|---|---|
| 941,292 | A | 11/1909 | Wieman |
| 1,230,664 | A | 6/1917 | Burdett |
| 1,266,411 | A | 5/1918 | Cornwell |
| 1,442,615 | A | 1/1923 | Humphrey |
| 1,864,264 | A | 6/1932 | Velkover |
| 2,016,263 | A | 10/1935 | Beythan |
| 2,126,105 | A | 8/1938 | Goheen |
| 2,713,763 | A | 7/1955 | Holman, et al. |
| 2,874,530 | A | 2/1959 | Miller, Sr. |
| 2,904,951 | A | 9/1959 | Glover |
| 3,701,243 | A | 10/1972 | Durkee |
| 3,750,379 | A | 8/1973 | Huspen |
| 3,804,451 | A | 4/1974 | Burke |
| 3,884,023 | A | 5/1975 | Robinson |
| 4,059,945 | A | 11/1977 | Martinez |
| 4,776,158 | A | 10/1988 | Baum |
| 4,850,185 | A | 7/1989 | Dimon |
| D329,177 | S | 9/1992 | Nace et al. |
| 5,305,591 | A | 4/1994 | Gibson, Jr. |
| 5,501,069 | A | 3/1996 | Lentz |
| 5,713,193 | A | 2/1998 | Stapley et al. |
| D474,948 | S | 5/2003 | Crites |

*Primary Examiner*—Robert E. Pezzuto
(74) *Attorney, Agent, or Firm*—Knobbe Martens Olson & Bear LLP

(57) ABSTRACT

A rake having a self-cleaning mechanism and method of its manufacture. The rake comprises a handle, a body, a plurality of tines extending from the body, a push-rod extending along the handle to the body, a push rod actuator for extending and retrieving the push-rod, an actuator bar slidingly attached to the body and connected to the push-rod, at least one extender connected to the actuator bar, and a cleaning bar attached to the extender(s). The cleaning bar has a plurality of cleaning channels, one for each tine and is extended and retrieved along the tines when the push-rod actuator is actuated. Each of the cleaning channels has a shape and a size that generally corresponds to a shape and a size of a respective one of the tines. Upon actuation, cleaning bar moves along the tines such that the cleaning channels remove debris from the tines.

44 Claims, 6 Drawing Sheets

SELF-CLEANING RAKE

BACKGROUND OF THE INVENTION

1. Field of the Invention

The invention relates generally to the field of rakes and specifically to the field of self-cleaning rakes.

2. Description of the Related Art

Yard and garden rakes have been in use for many decades. Some of the first rakes to be patented date back to the 1800s. A common problem encountered throughout the history of the rake is that leaves and other yard debris continuously become trapped in the tines of the rake during use. This has led to many designs for clearing the tines during the raking process, to thereby speed up the removal of debris. The designs fall mainly into three categories which are described below. In addition, most of the designs include a cleaner handle located along the rake handle that is connected to some sort of actuating rod or cable that actuates the cleaning mechanism at the rake tines.

The first category of designs includes rotating or pivoting cleaning bars or tines. These designs mainly utilize a pivot joint along the row of tines about which a cleaning rack rotates. The tines are partially surrounded by channels in the cleaning rack. As the cleaner handle is moved, the cleaning rack, which is mounted to the pivot joint, rotates about the pivot so that the channels rotate along a path that leads them along some or all of the length of the tines, thereby removing entrapped debris. In an alternative design, the tines are mounted on the pivot joint and when the cleaner handle is actuated the tines rotate to a flat position in line with the handle and are retracted through a cleaning rack. The pivot joint required by this type of design is complicated and somewhat delicate, leading to increased risk of failure of the cleaning mechanism.

The second type of design involves the movement of a support/cleaning bar along the length of the tines. In this type of design, the tines are retracted through a cleaning bar that provides support to the tines. In variations of this design, the cleaning bar is moved along the length of tines to remove entrapped debris. The cleaning bar of these designs acts as a support bar at or near the top of the tines and moves along the length of the tines. The tines of these designs are typically long and flexible, typical of leaf rakes. As the tines and cleaning bar move in relation to each other, the tines are pulled inward by the narrower cleaning bar. The movement inward, or closer together, of the tines can actually increase the binding force on debris caught between the tines and therefore lead to a failure of the cleaning process as the debris binds the cleaning bar and slows or stops it's progress. Additionally, the requirement of these designs, that the cleaning bar travel the length of the tines, requires either a long motion of the cleaning handle or complex linkages to amplify a slight motion of the cleaning handle into longer motion of the cleaning bar. Both of these options are undesirable. The cleaning motion should be short and easy and the linkage should be simple in order to minimize cost and limit the possibility of failure.

The third type of design involves mechanisms that slide a cleaning bar along a relatively short pathway to clean the tines through use of components that only slide along various parts of the rake. However, the rakes falling into this category are either only of the type that can be used for raking dirt or they include actuation components that are exposed and can become damaged or fouled.

From the above, it is apparent that there is a need for a self-cleaning rake that can be used for gathering lawn debris and utilizes a relatively short cleaning stroke by the user. There is a further need for a self-cleaning rake with a simple yet sturdy design that is inexpensive to manufacture and provides reliable performance while minimizing maintenance by the user.

SUMMARY OF THE INVENTION

The self-cleaning rake, methods for making and using the self-cleaning rake have several features, no single one of which is solely responsible for its desirable attributes. Without limiting the scope as expressed by the claims that follow, its more prominent features will now be discussed briefly. After considering this discussion, and particularly after reading the section entitled "Detailed Description of the Preferred Embodiments" one will understand how the features of the system and methods provide several advantages over traditional systems and methods.

In one embodiment, the self-cleaning rake comprises an elongated handle having a rake end, a handle end and a middle portion, a body lying generally in one plane and having an attachment end that is attached to the rake end of the handle. A tine end is located opposite the attachment end and a central portion is disposed between the attachment end and the tine end. A plurality of tines extend from and are fixed to the tine end of the body. An actuator bar channel is formed in the central portion of the body comprising a pair of major sides and a pair of minor sides, and an actuator bar is disposed within the actuator bar channel and extends generally parallel to the tine end of the body. A grip is disposed about the outside of the middle portion of the grip and adapted to slide along the handle. A push-rod having first and second ends is disposed along the handle and connected at the first end to the grip and connected at the second end to the actuator bar. A cleaning bar is disposed along the tine end of the body and has a plurality of channels, each of which is adapted to surround at least a portion of a respective one of the tines. A first extender channel is formed in the body and extends from the actuator channel to the tine end of the body. A first extender connecting the actuator bar to the cleaning bar wherein the actuator bar, the push-rod and the first extender are all enclosed within the self-cleaning rake when in a retracted position. In another embodiment, the above-described self-cleaning rake also includes a second extender channel formed in the body and extending from the actuator channel to the tine end of the body and a second extender connecting the actuator bar to the cleaning bar.

In another embodiment, the invention includes a self-cleaning rake body for use with a rake handle and actuating push-rod. The body includes a generally planar body having an attachment-end configured for attachment to the handle, and is defined by an elongated tine-end opposite the attachment end and a central actuation portion is disposed between the attachment-end and the tine-end. A plurality of tines extend from the tine-end of the body. An elongated actuator bar is enclosed within the actuation portion and extends generally parallel to the tine-end of the body, the actuator bar being adapted to engage the push-rod. An elongated cleaning bar is operably attached to the actuator bar and is disposed along the tine-end of the body. The cleaning bar has a plurality of cleaning channels, each of which is adapted to at least partially surround a portion of a respective one of the tines. The cleaning channels extend a distance of at least one quarter of an inch along the tines and have a cross-sectional area that is larger than a cross-sectional area of the tines, and the cleaning bar is adapted to extend to a distal end of the tines.

In yet another embodiment, a self-cleaning rake includes a handle having a longitudinal axis, a body, a plurality of tines extending from the body, a push-rod connected to the handle and extending to the body, and a push-rod actuator connected to the push-rod and adapted to extend and retrieve the push-rod along the longitudinal axis of the handle. An actuator bar is slidingly attached to the body and connected to the push-rod such that the push-rod can transmit force from the push-rod actuator to the actuator bar. The rake also includes a first extender having a first end and a second end, where the first end is attached to the actuator bar and the second end is connected to a cleaning bar. The cleaning bar has a plurality of cleaning channels, one for each tine. At least a portion of each of the cleaning channels has a shape and a size that corresponds to a shape and a size of a portion of a respective one of the tines.

The invention also includes a method of manufacturing a self-cleaning rake that includes forming a rake body with an attachment end, forming a tine-end that is wider than the attachment end and forming a central portion of the rake body. The method further includes attaching a handle to the attachment end of the body, housing a plurality of tines within the tine-end of the body, where the tines extend from the body in a direction that is not parallel with the handle and forming a plurality of channels in the central portion of the body, forming an actuator bar in one of the channels, where the actuator bar is adapted to slide up and down the body, and substantially surrounding the tines with a cleaning bar located along the tine-end of the body. The cleaning bar has a plurality of channels, at least one channel for each tine, and the cleaning bar is adapted to move along the length of the tines and connects at least one extender to the actuator bar and to the cleaning bar, where each of the at least one extender has first and second ends, and each of the at least one extender is adapted to connect at the first end to the actuator bar and to connect at the second end to the cleaning bar. In another embodiment, the above-described method of manufacturing a self-cleaning rake can also includes enclosing the plurality of channels of the body with a cover adapted to engage the body and at least partially encapsulating the extenders and the actuator bar.

Another embodiment includes a system of manufacturing a self-cleaning rake, the method includes means for forming a rake body with an attachment end and a tine-end that is wider than the attachment end and a central portion. The system includes means for attaching an elongated tubular handle to the attachment end of the body, means for housing a plurality of tines within the tine-end of the body wherein the tines extend from the body in a direction that is not parallel with the handle, and means for forming a plurality of channels in the central portion of the body. The system further includes means for forming an actuator bar in one of the channels in the central portion of the body that is adapted to slide up and down the body and means for substantially surrounding the tines with a cleaning bar located along the tine-end of the body and having a plurality of channels, where there is at least one channel for each tine, and the cleaning bar is adapted to move along the length of the tines. This embodiment further includes means for connecting at least one extender to the actuator bar and to the cleaning bar, where each of the at least one extender has a first and second end, and each of the at least one extender is adapted to connect at the first end to the actuator bar and to connect at the second end to the cleaning bar.

The invention also includes a method of using a rake that has a handle connected to a housing with a plurality of tines at one end thereof, where and method includes moving the push-rod along the handle and moving a cleaning mechanism in response to the movement of the push-rod. The method further includes moving a cleaning bar in response to movement of the cleaning mechanism, wherein the cleaning bar includes at least one cleaning channel that substantially surrounds at least one respective tine such that the act of moving the cleaning bar moves the cleaning bar along the at least one tine so as to remove debris located in contact with the at least one tine. A portion of the at least one cleaning channel extends beyond the end of the at least one tine during a portion of the movement of the cleaning bar along the at least one tine.

In another embodiment, a self-cleaning rake has a handle connected to a housing with a plurality of tines at one end thereof, and includes means for moving a push-rod along the handle and means for moving a cleaning mechanism in response to movement of the push-rod. The rake also includes means for moving a cleaning bar in response to movement of the cleaning mechanism, wherein the cleaning bar includes at least one cleaning channel that substantially surrounds at least one respective tine such that the act of moving the cleaning bar moves the cleaning bar along the at least one tine so as to remove debris located in contact with the at least one tine, and wherein a portion of the at least one cleaning channel extends beyond the end of the at least one tine during a portion of the movement of the cleaning bar along the at least one tine.

In yet another embodiment, the self-cleaning rake includes a handle, a body attached to the handle, where body comprises a cleaning mechanism, a plurality of tines attached to the body, and a cleaning member connected to the cleaning mechanism. The cleaning member is associated with at least one of the plurality of tines and the cleaning member surrounds the associated tine and travels along at least a portion of the associated tine to a location at least to the distal end of the associated tine and removes material located on the associated tine.

DETAILED DESCRIPTION OF PREFERRED EMBODIMENTS

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
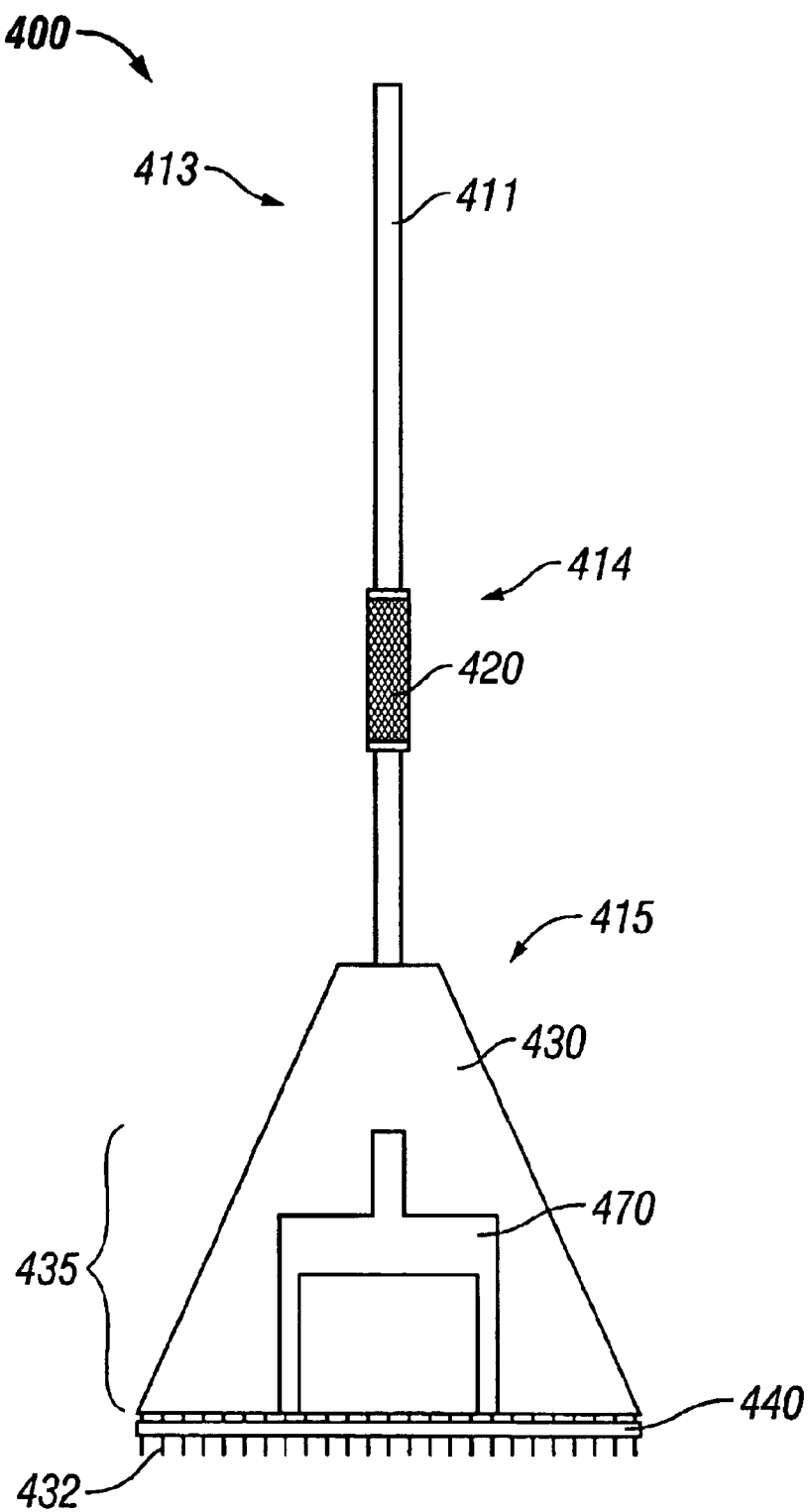
FIG. 1 is a top plan view of one embodiment of a self-cleaning rake.

FIG. 1 is a top plan view of one example embodiment of a self-cleaning rake 400. The illustrated rake includes a handle 411 and a body 430. The handle 411 can be an elongated tube having an attachment portion 415 at one end that attaches the handle 411 to the body 430, a grip portion 413 opposite the attachment portion 415, and an actuation portion 414 located between the attachment portion 415 and the grip portion 413. A user holds onto the grip portion 413 with one hand while raking or cleaning the rake 400 with the other hand. The actuation portion 414 can be at or near the middle of the handle 411 and provides a location for some of the components that actuate a cleaning mechanism 435 of the rake 400. An actuator handle assembly 420 can be located coaxially about the handle 411 at the actuation portion 414 and allows an operator to actuate a cleaning mechanism 435 of the rake 400. The user can hold onto the actuator handle assembly 420 or the actuation portion 414 of the handle 411 during raking. The handle 411 can be made of any suitable material. In certain embodiments, metal is used, while in other embodiments composite materials such as fiberglass or carbon fiber are used. In other embodiments, any durable plastic can be used. Materials that are used in most embodiments have a relatively high strength, yet are relatively inexpensive and widely available.

FIG. 1 also illustrates an overview of one embodiment of the body 430 of the rake 400 that is attached to the attachment end 415 of the handle 411. In this embodiment, the body 430 is a generally planar extension designed to gather debris. The body 430 has a plurality of tines 432 that extend from a lateral side that is opposite of the side of the body 430 that is attached to the handle 411. The body 430 is generally enclosed and in some embodiments is generally solid. The tines 432 are exposed beyond the location where they extend out of the body 430. The tines 432 are designed to effectively separate debris from a surface such as grass, dirt or other substance that is to be raked. The tines 432 of many embodiments are made of plastic, a composite material, steel or another suitable metal, however, other materials can be used as well. Some embodiments of the invention utilize tines that can be of a square or rectangular cross-sectional shape. In other embodiments, the tines 432 can be formed into other cross-sectional shapes such as circles, ovals or any other polygonal or curved shape. Such shapes may assist in preventing debris from becoming stuck between the tines 432, which degrades the effectiveness of the rake 400.

A cleaning bar 440 of this embodiment is also attached to the body 430 and surrounds tines 432. The embodiment of the body 430 illustrated in FIG. 1 can be configured substantially from one unitary part. In other embodiments, the body 430 is made up of multiple parts that fulfill the functions described above and below. The body 430 can be configured into the desired shape and secures the tines 432 that extend from its bottom. In one embodiment, the body 430 is one piece formed into the desired shape. As is also illustrated, the body 430 can include one or more internal channels 470 or cavities that house the actuating parts of the self-cleaning mechanism described below. In one embodiment, the body can be formed of a suitable plastic, although any other well known material can be used for this part, including metal, fiberglass or other composite, wood-based products or any other substantially rigid material. The body will be more fully described with reference to FIGS. 5 and 6.

Figure 2:
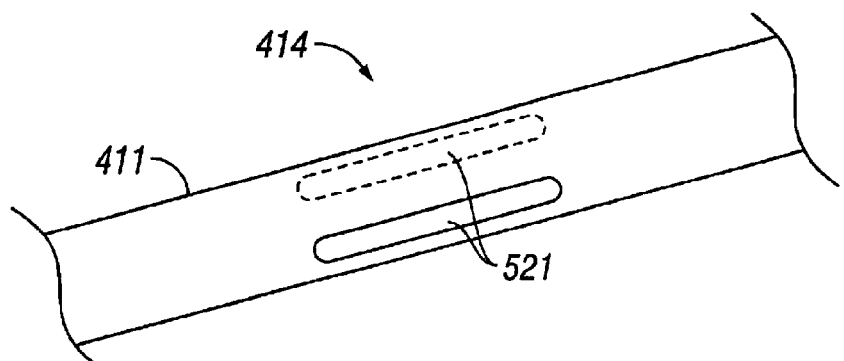
FIG. 2 is a detail view of the slotted portion of the handle of the rake of FIG. 1.
Figure 4:
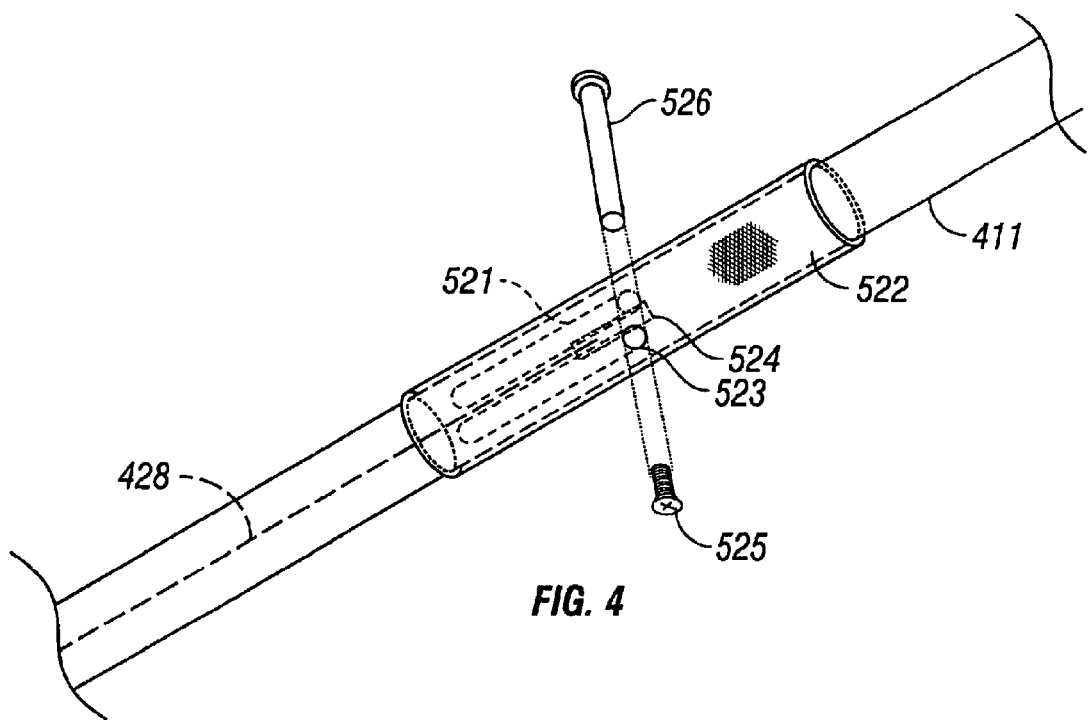
FIG. 4 is an exploded perspective view of the actuating handle linkage mechanism of the rake of FIG. 1.

FIG. 2 illustrates an embodiment configuration of the actuation portion 414 of the handle 411 of the rake 400 illustrated in FIG. 1 and FIG. 4. The actuation portion 414 of the handle 411 in this embodiment includes two slots 521 that each run longitudinally along the sides of the handle 411 in a parallel orientation. The two illustrated slots 521 are diametrically opposed from one another and run along the same lengths of their respective sides of the handle 411. However, in other embodiments, the slots 521 may not be located at diametrically opposed positions on the handle 411.

Figure 3:
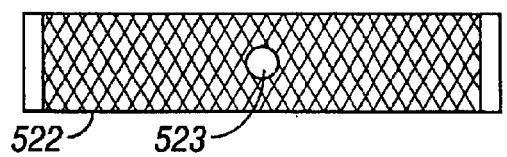
FIG. 3 is a side view of a grip for actuating the self-cleaning mechanism of the rake of FIG. 1.

FIGS. 3 and 4 illustrate an embodiment of an actuator handle assembly 420 for a push-rod 428 for use with the self-cleaning rake 400 of FIG. 1. One embodiment of a grip 522 that can be included in actuator handle assembly 420 is shown in FIG. 3. In this embodiment, the grip 522 is a tube located along the actuation portion 414 of the handle 411, as shown in FIG. 4, having an inner diameter that is large enough to fit over the handle 411 of the rake 400, and forming a place for the user to actuate the cleaning mechanism of the rake 400. The grip 522 includes a pin hole 523 located in a position that corresponds with slots 521. The grip 522 is positioned about the handle 411 in an orientation such that the pin hole 523 is aligned with at least one of the two slots 521 in the handle 411. The grip 522 in this embodiment has a finish on the outer surface that aids an operator in holding onto the grip 522 during operation or cleaning of the rake. This finish can be a simple knurling of the outside of the grip 522 as illustrated, or can be any other treatment such as ridges or other raised or uneven portions. Some embodiments include a cover (not shown) that is applied to the outside of the grip 522. The cover can be made from material that can be bonded, molded, adhered or otherwise mated with the outside surface of the grip 522 to increase the friction between the user's hands and the grip 522, for example, rubber, plastic, or other suitable material. The grip 522 can be made of metal, plastic, wood or paper products, ceramic, fiberglass or other resin or composite materials, or any combination thereof.

FIG. 4 shows one embodiment of the actuator handle assembly 420 that includes a push-rod 428 that is attached to the grip 522 using a connector 524 and a pin 526. The pin hole 523 is a transverse opening formed through the sides of the grip 522. In the embodiment illustrated, the pin hole 523 is a generally circular cut in two opposite sides of the grip 522 that correspond to the angular positioning of the slots 521 in the handle 411.

The grip 522 is positioned by the pin 526, a retainer 525 and the two opposing slots 521. The pin 526 is passed through the pin hole 523 of the grip 522 and through the slots 521 of the handle 411. In this embodiment, the pin 526 can be then mated with the pin retainer 525 that holds the pin 527 in the pin hole 523 and in the slots 521. In this embodiment, the pin 526 has a set of internal female threads and the pin retainer 525 is a mating fastener having male threads that fit within the end of the pin 526 and mates with its threads. In other embodiments, the pin 526 has a channel formed around its circumference near the end that is inserted through the grip 522 and the retainer 525 is a snap ring that fits tightly within the channel in the pin 526. The retainer 526 of such embodiments is of a size that does not fit in the pin hole 523 or the slots 521 and therefore effectively retains the pin 526 in the grip 522. In yet other embodiments, the pin 526 can be formed to retain itself in the pin hole 523. In these embodiments, the pin 526 can be formed as a rivet or other such device with two ends that are each larger than the pin hole 523 and therefore retain the pin 526 in its position within the grip 522 and the handle 411.

In this embodiment, the push-rod 428 can be located inside a hollow handle 411 and is therefore not exposed to the external environment. This protects the push-rod 428 from damage that could occur if it were not so protected. Damage to the push-rod 428 of most embodiments could adversely affect the self-cleaning mechanism. In another embodiment, the push-rod 428 can be configured external to the handle 411. In this embodiment, the push-rod 428 can be connected to the pin 526 using a connector 524 that is attached to the end, or near the end, of the push-rod 428. In one embodiment, the connector 524 can be cylindrically shaped and have a larger diameter than the push-rod 428 allowing the pin 526 to pass through a hole in the connector 524 so that the push-rod is connected to the grip 522. In another embodiment, the push-rod 428 itself has a hole formed through its end that the pin 526 is passed through to connect the push-rod to the grip 522. In other example embodiments, a rod end is attached to the push-rod 428 with an eyelet to create the hole in the end of the push-rod 428, or the push-rod 428 itself has an eyelet formed on the end that allows the pin 526 to pass through the eyelet and connect the push-rod 428 to the grip 522. Other embodiments utilize many different mechanisms to connect the push-rod 428 to the pin 526.

Figure 5:
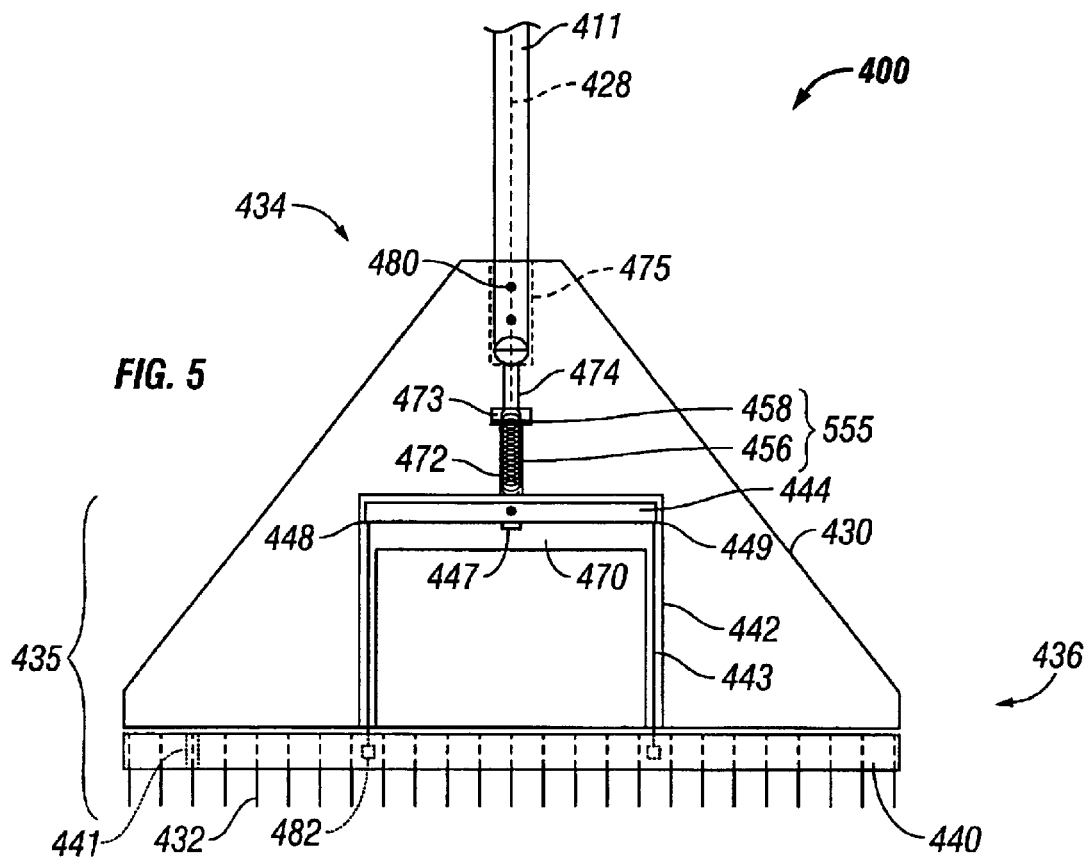
FIG. 5 is a view of the body of the rake of FIG. 1 illustrating the lower actuating components.

FIG. 5 illustrates one embodiment of the body 430 of the rake 400 of FIG. 1. The body 430 of the rake 400 is a combination of parts that fulfill the raking and self-cleaning functions. The body 430 includes a number of tines 432 for performing the raking function. In the illustrated embodiment, the body 430 is defined by a group of tines 432 whose main portions substantially lie within a common plane. The body 430 widens from a relatively narrow attachment end 434, where it attaches to the handle 411, to a relatively wider tine end 436, where the tines 432 extend away from the body 430 and downwardly from the common plane to their distal ends. In this embodiment, the plurality of tines are attached to the tine end 436 of the body 430, and extend from the tine end 436 of the body 430. The body 430 is a generally flat planar member of any polygonal or other shape connected at the attachment end 434 to the handle 411 and having tines 432 extending from the tine end 436.

The cleaning mechanism 435 of this embodiment is housed in or on the body 430 and consists of a cleaning bar 440, two extender channels 442 that are formed in the body 430, two extenders 443 and an actuator bar 444. Although this embodiment illustrates two extenders 443, other embodiments can include one extender or three or more extenders. The extenders 443 and the actuator bar 444 and cleaning bar 440 can be fabricated as one piece or separate pieces. In other embodiments, the extenders 443 and the actuator bar 444 can be made as one piece, or the actuator bar 444 and cleaning bar 440 can be made as one piece. In an alternative embodiment, the extenders 443, the actuator bar 444, the push-rod 428 and the cleaning bar 440 can be fabricated as one piece. The actuator bar 444 can be an elongated strut with three connection points 447, 448 and 449 that is designed to transmit and distribute actuating force from the push-rod 428 to the two extenders 443. In the illustrated embodiment, the actuator bar 444 is an elongated rectangle that connects to the push-rod 428 at the first connection point 447 and to the two extenders 443 at the second and third connection points 448, 449. The push-rod 428 transmits force from the grip 522 to the actuator bar 444, which in turn distributes that force substantially equally to the two extenders 443. The push-rod 428 can be connected to the actuator bar 444 using any suitable means. In other embodiments, the push-rod 428 and the actuator bar 444 can be fabricated to be one piece, the actuator bar 444 and the extenders 443 can be fabricated to be one piece, or the push-rod 428, the actuator bar 444 and the extenders can all be fabricated to be one piece. The shape of the actuator bar 444 can be any shape that is capable of connecting to the push-rod 428 and the extenders 443. For example, shapes such as triangles, arcs or any other polygonal or other shape can be used.

The illustrated body 430 is attached to the handle 411 at its attachment end 434 and houses the tines 432, a spring return mechanism 555 and several components that make up a cleaning mechanism 435, described further below. As mentioned above, the push-rod 428 illustrated in FIGS. 4 and 5 is located inside the handle 411 of the rake 400. One end of the push-rod 428, or near one end of the push-rod 428 attaches to the grip 522 (e.g., using connector 524 and pin 526) and at the other end of the push-rod 428 or near the end of the push-rod 428 connects to the actuator bar 444. In this embodiment, the push-rod 428 runs longitudinally inside the handle 41, through a spring 456 and transmits the actuating force from the grip 522 via the pin 526 to the actuator bar 444 to operate the cleaning mechanism 435. As many embodiments of the handle 411 are hollow tubes, the push-rod 428 is therefore free to move within the handle 411 during actuation by the grip 522. The body 430 can be a unitary part or can be formed from multiple pieces. As mentioned above, the body 430 includes one or more channels or cavities (described below) that house internal components of the rake 400.

Figure 6:
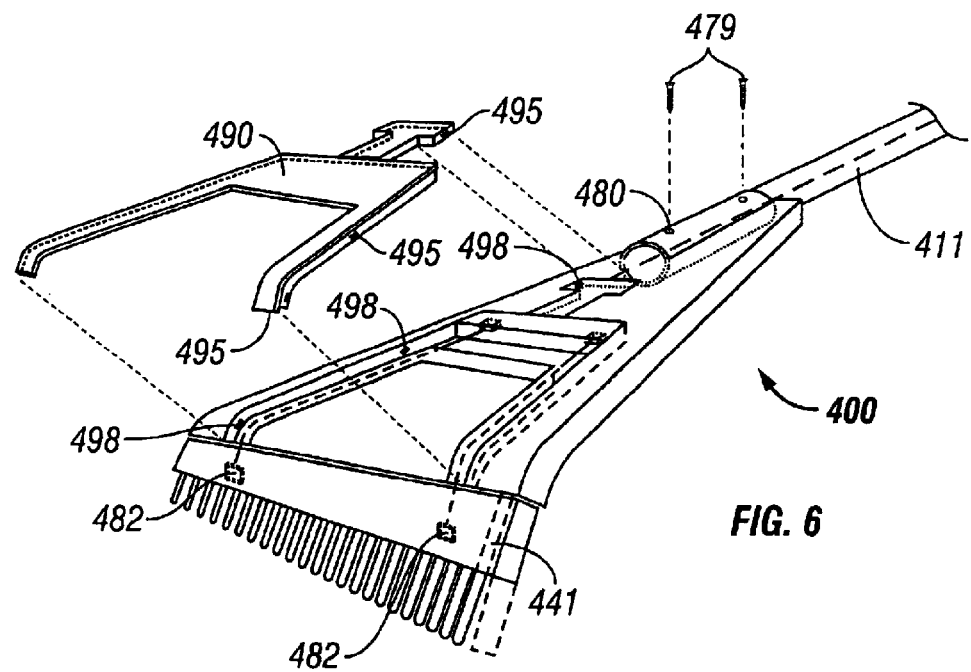
FIG. 6 is an perspective view of the body of the rake of FIG. 1.

Referring to FIGS. 5 and 6, the body 430 has an actuator bar channel 470 formed in a central portion of the body 430 between the attachment end 434 and the tine end 436. The actuator bar channel 470 is a transverse channel cut out of or formed within the body 430 and is sized sufficiently to at least partially contain the actuator bar 444 of this embodiment. The actuator bar channel 470 is only slightly wider than the actuator bar 444 but has a height that allows the actuator bar 444 to travel the full length required to correspondingly move the cleaning bar 440 to clean the plurality of tines 432 during cleaning operations. In some embodiments, the height of the actuator bar channel 470 is slightly larger than the height of the actuator bar 444 added to the length of travel of the push-rod 428. The height of the channel 470 allows the cleaning bar 444 to travel to the distal end or past the distal end of the tines 432. The slots 21 in the handle 11 can be correspondingly long to accommodate such travel of the cleaning bar 444.

As shown in FIG. 5, the body 430 also includes a spring channel 472 to house a spring 456 used for the spring return mechanism of the illustrated embodiment. The spring return mechanism comprises a spring brace 458 and a spring 456. The illustrated spring 456 is a standard wound spiral spring having two ends, one attached to the spring brace 458 and the other attached to the actuator bar 444. The top end of the spring 456 is attached to the spring brace 458. The spring brace 458 of this embodiment is situated inside a spring brace channel 473 located at the top of the spring channel 472 and is at least slightly wider than the spring channel 472 so that the spring brace 458 is retained while the spring 456 is stretched. In other embodiments, the spring can be one or more of a spring-like device(which are also referred to herein as a "spring") that is capable of returning the actuator handle assembly 420 to an at rest position. In one example, the spring can be a leaf spring that is placed within the actuating bar channel 470 between the bottom of the actuator bar 444 and the bottom of the actuating bar channel 470. In some embodiments, the actuator bar 444 and/or the actuator bar channel 470 can include recessed portions that can help hold the spring in place. In one embodiment, the bottom of the actuator bar 444 can include a recess configured such that a spring fits into and is held in place by the recess. In another embodiment, the actuator bar channel 470 can include one or more recessed portions on any surface where a spring can contact the actuator bar channel 470. For example, any one or more of the sides of the actuator bar channel 470 can include a recessed portion, or the bottom of the actuator bar channel 470 can include a recessed portion. In yet another embodiment, the actuator bar 444 and one or more sides of the actuator bar channel 470 include a recessed portion. In another embodiment, the cover 490 can include a recessed portion that at least partially holds the spring in place. In other embodiments, the coils at the top of the spring 456, (i.e., that portion closest to the handle 411), can be wider than the bottom of the spring 456 so that a spring brace may not be needed. In another embodiment, the topmost coil(s) of the spring can be wider than the remaining coils of the spring 456 which can be substantially the same size, and this configuration can also obviate the need for use of the spring brace 458.

When the actuator bar 444 is pushed down by the push-rod 428 of such embodiments, the spring 456 is stretched and applies a resilient return force to return the actuator bar 444 to its rest position at the top of the actuating bar channel 470. In other embodiments, the spring 456 can be connected to the push-rod 428 instead of the actuator bar 444. When the actuator bar 444 is pushed down by the push-rod 428, the actuator bar 444 moves away from the spring bracket 458 and the spring 456 is stretched by its attachment to the spring bracket 458 and the actuator bar 444. The spring 456 then applies a returning resilient force to the actuator bar 444 tending to return the actuator bar 444 to its retracted position. In another embodiment (not shown), the spring brace 458 is mounted below the actuator bar 444 and when the actuator bar 444 is extended by the push-rod 428, the spring 456 is compressed, thereby providing a compressive return force to the actuator bar 444. Additionally, while the illustrated spring 456 is a simple wound spring, any resilient member that can provide the resilient return force can be used. The spring channel 472 is formed in the body 430 generally perpendicular to the actuator bar 444 and intersects the actuator bar channel 470 at the top of the actuator bar 444. The spring 456 is set inside the spring channel 472 and is attached at the bottom end to the top of the actuator bar 444.

Referring to FIGS. 1–6, when debris becomes stuck on or between one or more tines 432, the user grasps the grip 422 and moves it down the handle 411 toward the body 430. The slots 521 in the handle 411 limit the range of this motion. The push rod 428 connected to the grip 522 is moved accordingly down the handle 411 and along the body thereby moving the actuator bar 444 along a relatively equal displacement. The actuator bar 444 distributes the actuating force applied by the user to the two extenders 443. The two extenders 443 are substantially incompressible and therefore are displaced by the actuating force. The extender channels 442 limit the movement of the extenders 443 so that the displacement of the extenders 443 is directed onto and substantially in line with the cleaning bar 440. The cleaning bar 440 then moves down along the length of the tines 432. The bottoms of the cleaning channels 441 then remove the stuck debris from the tines 432 as they are displaced near, to or beyond the distal ends of the tines 432. The user then returns the grip 522 to its original position by pulling it back up the handle 411. This action is assisted by the spring return mechanism 555 in returning the grip 522 to the original, at-rest position. The push-rod 428, the actuator bar 444 and the extenders 443 then retract the cleaning bar 440 to its rest position at or near the tops of the tines 432.

The length of the slots 521 in the handle 411 determine the length of travel of the cleaning bar 440. In general, the grip 522, the push-rod 428, the actuator bar 444, the extenders 443 and extender channels 442 are designed such that the cleaning bar 440 is displaced along the tines 432 substantially the same distance that the grip 522 is moved down the handle 411. Movement of the pin 526 in the slots 521 controls the movement of the grip 522 along the handle 411. Therefore, in embodiments where the bottom of the cleaning channels 441 extend to the distal ends of the tines 432, the pin 526 travels in the slots 521 a distance that is substantially the same as the length of the tines 432 exposed beyond the bottoms of the cleaning channels 441 in the cleaning bar 440. If the bottom of the cleaning bar 440 is to move beyond the distal ends of the tines 432, then the grip travel, and the travel of the pin 526 during operation, is greater than the length of the tines 432 that is exposed. The length of the slots 521 also provides a positive stop for the travel of the cleaning bar 440, preventing it from being extended too far such that it may become stuck on the ends of the tines 432. This rake 400 includes a cleaning channel 441 for each tine 432, while the cleaning channel 441 can completely surrounds its respective tine 432, as illustrated in this embodiment. An another embodiment (not shown), the cleaning channel 441 can surround at least a portion of its respective tine 432. In yet another embodiment (not shown), the cleaning channel 441 can surround a substantial portion of its respective tine 432. Many embodiments of the invention provide channels that completely surround all of the tines 432 and thus the embodiments are capable of cleaning all of the tines 432 all the way to their distal ends or beyond to effectively and easily allow the user to remove debris from the rake 400.

In the embodiment illustrated in FIG. 5, the handle 411 is inserted into the attachment end 434 of the body 430 in a handle channel 475. There it is retained by one or more handle fasteners 479 that are inserted through handle fastener holes 480 in the body 430 where they fasten the handle 411 to the body 430. The push-rod 428 of this embodiment runs through the inside of the handle 411 and runs through the handle channel 475 to a push-rod channel 474. The push-rod channel 474 connects the handle channel 475 to the spring brace channel 473, thereby completing a channel path from the top of the body 430 to the actuator bar 444. This allows the push-rod 428 to run through the handle 411, the body 430, the spring brace 473 and the spring 456 to connect to the actuator bar 444 and thereby directly transmit force and motion from the pin 426 in the grip 422 to the actuator bar 444. In an alternative embodiment, the spring 456 can be configured to be partially or completely outside of the body 430 (not shown), and in such embodiments, the configuration of the push-rod 428 can include not running the push-rod 428 through the spring 456.

As is also illustrated in FIGS. 5 and 6, the extenders are contained within extender channels 442 that are formed directly in the body 430. The extenders 443 are somewhat flexible members capable of transmitting actuating force from the actuating bar 444 to the cleaning bar 440. The extenders 443 serve an important function in the rake 400 by changing the direction of the actuating force from parallel with the handle 411 to parallel with the tines 342. The extenders 443 of many embodiments are cables, while other embodiments are created from flexible material such as flexible plastic or are specialty materials or chains that can articulate while transmitting the actuating force. In certain embodiments, metal is used, while in other embodiments composite materials such as fiberglass or carbon fiber are used. In other embodiments, any durable plastic can be used. Materials that are used in most embodiments have a relatively high strength, yet are relatively inexpensive and widely available.

The extenders 443 of such embodiments can be any elongated member capable of resisting compression so that when the actuator bar 444 applies a force to the extenders 443, the extenders 443 transmit that force along to the cleaning bar 440, which is then displaced along the exposed length of the tines 432 as described above. The extenders 443 are encouraged along their curvilinear path by the restrictive passages formed by the extender channels 442. While the extenders 443 may deflect slightly in their passages formed by the extender channels 443, the deflection is limited so that nearly all of the motion of the actuator bar 444 is translated into corresponding motion of the cleaning bar 440 along the tines 432. The extenders 443 are guided in their motion by the extender channels 442. The extender channels 442 are channels attached to or formed in the body 430 and provide lateral limitation to the movement of the extenders 443, thereby ensuring the extenders 443 substantially only move along their curvilinear axes. In this embodiment, the actuator bar 444, the push-rod 428 and the extenders 443 are configured so that they are all enclosed within the self-cleaning rake when in a retracted position. The extender channels 442 illustrated in FIGS. 5 and 6 are only slightly larger in internal diameter or size than the outside diameter or size of the extenders 443.

The extender channels 442 are cutouts in the body 430 running generally from either end of the actuator bar channel 470 to the tine end 436 of the body 430. Any suitable channel formed in the body 430 that is capable of limiting the lateral motion of the extenders 443 can be used. The channels can be produced simply by removing material from the body 432 itself to form the extender channels 442. These extender channels 442 make the characteristic bend from the plane of the body 430 and handle 411 to the plane of the tines 432. The extenders 443 extend out of the bottom of the tine end 436 of the body 430 where they connect to the cleaning bar 440 via cleaning bar connections 482. In an alternative embodiment, the extenders 440 extend out of the body of the tine end 436 of the body 430 and are fabricated as one piece with the cleaning bar 440 obviating connections 482. The cleaning bar connections 482 connect the extenders 443 to the cleaning bar 440 and can be bare fasteners that apply a clamping force to the extenders 443 and the cleaning bar 440 or they can be a clamp that is drawn in by a fastener to apply a clamping force to the extenders 443 and the cleaning bar 440. In other embodiments, any other type of connector or clamp can be used.

The cleaning bar 440 is an elongated bar spanning the width of the tine end 436 of the body 430 and extending beyond the last tine 432 on either end. The cleaning bar 440 has a number of cleaning channels 441 equal to the number of tines 432 on the rake 400. The cleaning channels 441 extend within the cleaning bar 440 in individual paths that are each generally collinear with a respective tine 432. The cleaning channels 441 of the illustrated embodiment have a cross-sectional shape that is substantially the same shape as that of the tines 432 and are of an area that is only slightly larger than that of the tines 432. This provides close tolerances between the tines 432 and the cleaning channels 441 leading to a superior cleaning function of the cleaning bar 440, but allows enough space between the tines 432 and the cleaning channels 441 to prevent binding of the cleaning bar 440 when the cleaning bar 440 cleans the tines 432. The cleaning bar 440 and the cleaning channels 441 extend or travel a distance along the tines 432 that is sufficient to provide stability and support during raking and cleaning. The length of the cleaning channels 441 and cleaning bar 440 of the illustrated embodiment is about 2 inches however any such length that can effectively maintain the alignment of the cleaning channels 441 with respect to the tines 432 can be used. Many embodiments utilize lengths of up to or greater than ½ of an inch, while other embodiments utilize a length of at least ¾ of an inch, 1 inch, 1-½ inch, 1-¾ inch, 2 inches or more. The length of the cleaning bar 440 and its cleaning channels 441 provide added stability to the rake 400. A cleaning bar 440 and cleaning channels 441 of a variety of suitable lengths can be used in various embodiments of the invention. The cleaning bar 440 is moved up and down the tines 432 by the extenders 443, which in turn are moved along their curvilinear paths by the actuator bar 444. As mentioned above, the cleaning bar 440 is moved up and down the tines and has at least one portion of its cleaning channels 441 that has a cross-sectional size that is only slightly larger than the cross-sectional size of the tines 432 and is thereby able to scrape any debris from the tines 432.

FIG. 6 also illustrates a channel cover 490 that fits over the top of the body 430 to encapsulate the extenders 443, actuator bar 444, push-rod 428, spring 456 and spring brace 458 within their respective channels 442, 470, 474, 472, and 473. In the illustrated embodiment, the channel cover 490 forms the top portion of the extender channels 442. However, the extender channels can be formed almost entirely within the body 430 in other embodiments. In yet other embodiments, the extender channels 442 are formed mainly in the channel cover 490. The channel cover 490 can be attached to the body 430 by any mechanism suitable for the attachment such as, but not limited to, fasteners, clips, snap fitting, adhesion, bonding, or any other method mechanism. In the embodiment that is illustrated in FIG. 6, the channel cover 490 has multiple raised catches 495, detents or other raised or imbedded parts that extend from the immediate area of the molded channel cover 490 to engage with mating recesses 498 formed into the body 430 to secure the channel cover 490 to the body 430. In this embodiment, the channel cover 490 is mated with the body 430 and then is snapped into engagement with the body 430.

The body 430 of this embodiment can be made of metal, plastic, fiberglass or other composite, paper or wood-based products or any other substantially rigid material. Some embodiments are manufactured by injection molding as a complete body 430 and channel cover 490 in which the rest of the components are applied and inserted. Some embodiments utilize one unitary piece to build the body 430 in a similar shape as the illustrated finished product, while other embodiments create two parts that are folded or are otherwise attached to one another to form the illustrated embodiment. The tines 432 can be individual pieces of metal, plastic, or other rigid material extending all the way through the body 430 to the attachment end 434 as shown in previous embodiments. In other embodiments, the tines 432 only extend partially through the body 430 or even only slightly into the body 430. In yet other embodiments, several or all of the tines 432 are attached as one piece that is held within the body 432 so that only the bottoms extend from the tine end 436 of the body 430.

Figure 7:
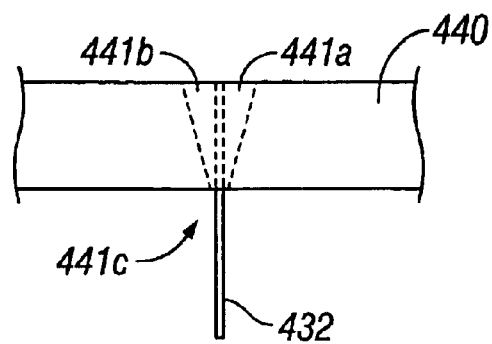
FIG. 7 is an exploded view of an alternative embodiment of a channel in the cleaning bar.

In the illustrated embodiment of FIG. 6, the cross-sectional area of the cleaning channels 441 is uniform along the length of the cleaning channels 441. However, in other embodiments the cross-sectional area of the cleaning channels 441 changes along their respective lengths. For example, FIG. 7 shows a view of a portion of the cleaning bar 440 of FIG. 6, and illustrates an embodiment where the cleaning channels 441a are largest at their top 441b and smallest at their bottom 441c, where the bottom 441c of each cleaning channel 441a is the part that extends near, to or beyond the distal end of its respective tine 432. When the bottom 441c of the cleaning channel 441a is nearly the same size as its respective tine 432, it is unlikely that debris can get into the cleaning channel 441a between the tine 432 and the cleaning channel 441a wall and foul or hinder the self-cleaning mechanism 435. By having a channel geometry where the top 441b is wider than the bottom 441c, as shown in FIG. 7, the cleaning bar can compensate for slight misalignment that can occur during operation, while maximizing the cleaning function of the cleaning bar 440. The shape of the cleaning channels 441 and tines 432 can be specifically designed to reduce the possibility that debris will become stuck on or between the tines 432. A circular or ovular cross-sectional shape reduces the parallel surface area between adjacent tines 432, and in general can reduce the likelihood of debris becoming stuck between adjacent tines 432. Other such considerations can be used to also reduce this likelihood, such as selecting materials with reduced coefficients of friction for manufacturing or coating the tines 432. In one alternative embodiment, debris is prevented from entering cleaning channel 441 by a cleaning channel guard (not shown) disposed on the end of the cleaning channel 441 closest to the body 430 which covers the opening of the cleaning channel 441 but allows the cleaning bar to move along the tines 432.

Figure 8:
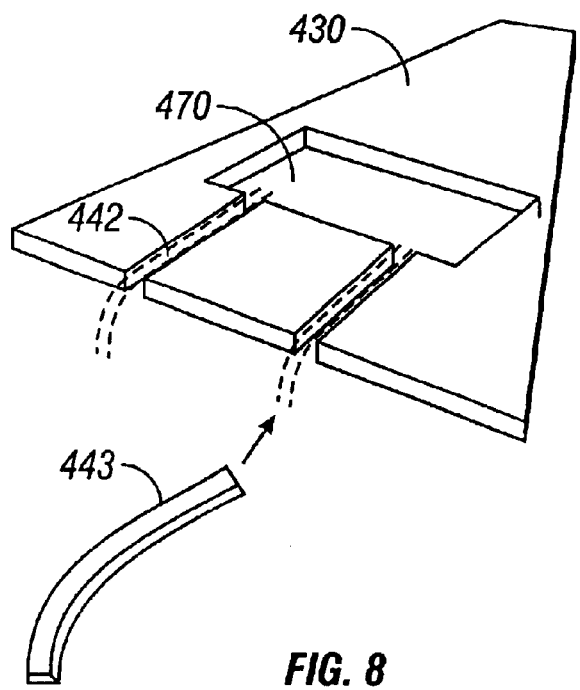
FIG. 8 is a perspective view of an alternative extender for use in the body of the rake illustrated in FIG. 1.
Figure 9:
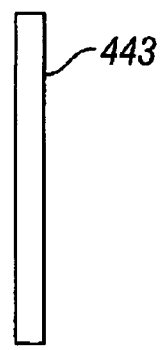
FIG. 9 is a top view of the extender of FIG. 8.

FIGS. 8 and 9 illustrate an alternative extender 443 made of a flexible material to navigate the curvilinear extender channels 442 of the body 430. As illustrated, the extender 443 is a somewhat flat piece of flexible material of a substantially rectangular cross-section that is extruded over a length that is appropriate for the extender 443. Referring to FIGS. 5, 8 and 9, in many embodiments a rectangular cross-section is selected so that the extender 443 resists bending along the minor axis of the rectangle and allows the elastic bending about the major axis. This shape is utilized to enhance the ability of the extenders 443 to change the direction of the applied force from a direction parallel to the handle 411 to a path parallel to the tines 432. This is accomplished by the flexing of the extenders 443 of this embodiment against the minor axis of the rectangular cross-section. The major axis of the cross-sectional shape of the extenders 443 create an increased resistance to bending to the sides of the inside of the extender channel 442, thereby increasing the amount of motion that is transferred to the cleaning bar 440 during cleaning operation. In other embodiments, the cross-sections of the extenders 443 can be other shapes, for example, triangular, semicircular, or circular. The term extruded is used to describe the shape of the extender 443, and though extrusion may be the manufacturing method of some embodiments, any suitable manufacturing method can be used. In some embodiments, the extenders 443 are formed as part of the actuator bar 444 or are dovetailed into or otherwise connected to the actuator bar 444. The embodiments that are illustrated show the use of two extenders but more or less extenders can be used. The extenders 443 can be made of metal, plastic, or any other material capable of supporting compression and capable of elastic deformation as the extender travels the curvilinear path of the extender channels 442.

Figure 10:
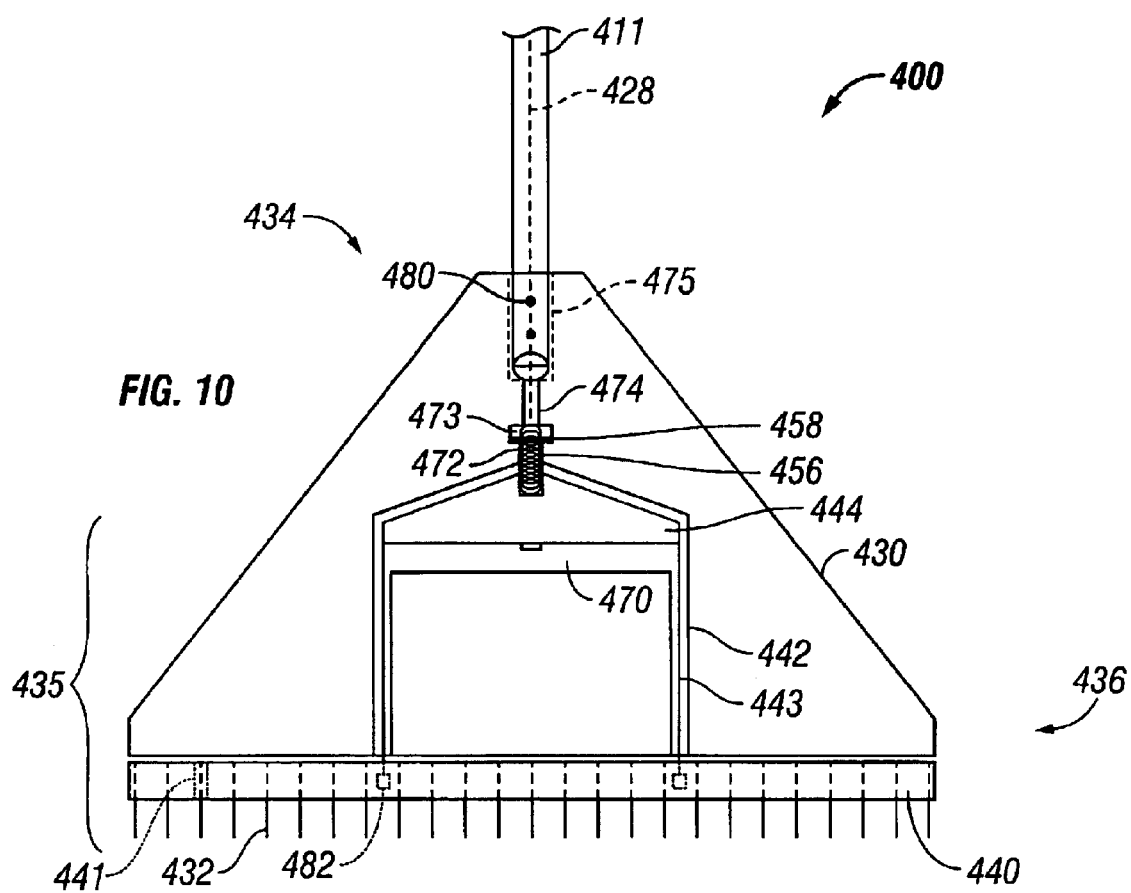
FIG. 10 is a top view of the body of a rake illustrating an alternative embodiment of an actuator bar and actuator bar channel.

FIG. 10 shows a top view of the body 430 of a rake illustrating an alternative embodiment of an actuator bar 444 and actuator bar channel 470. Although the rake body 430 is generally similar to the rake body 430 shown in FIG. 5, the actuator bar 444 in FIG. 10 is configured such the pair of major sides of the actuator bar are not parallel. In one embodiment, the side of the actuator bar 444 that connects to the spring 456 is triangular-shaped. For example, major side of the actuator bar farthest from the tine edge of the body 430 comprises two edges disposed such that the two edges are non-parallel and connect generally forming an angled side. To accommodate this embodiment of the actuator bar 444, the actuator bar channel 470 is also configured with a correspondingly shaped side to accommodate the shape of the actuator bar. In alternative embodiments, the cleaning bar 444 can have a side(s) of another shape, for example, a curved or arched shape side(s) (not shown) and the actuator bar channel 470 can be suitably configured to accommodate the curved or arched shaped side(s) (not shown).

Figure 11:
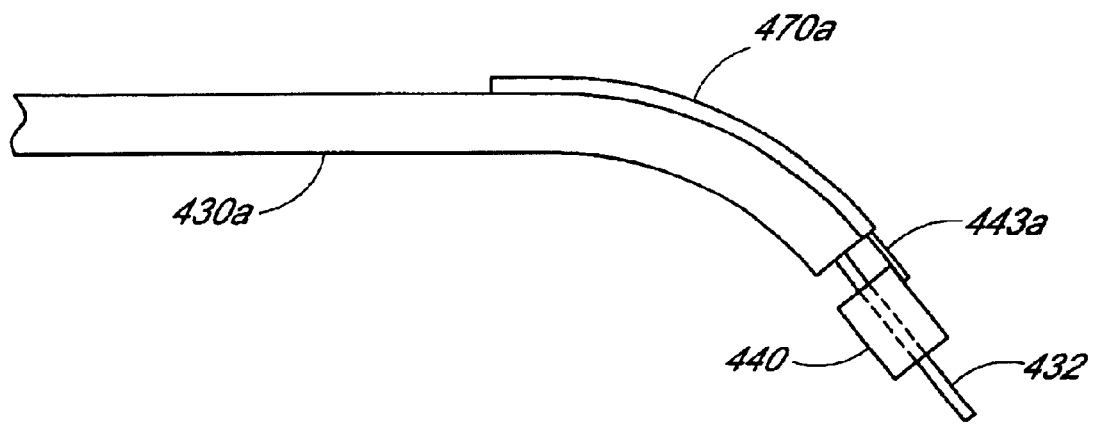
FIG. 11 is a side view of a portion of the body of a rake illustrating an alternative embodiment of the extender.

FIG. 11 shows an embodiment illustrating a side view of a portion of the self-cleaning rake that includes a single extender 443a. In this embodiment, the extender channel 470a is on the topmost surface of the body 430a and encloses a single extender 443a. The extender 443a extends from the extender channel 470a and is attached to the cleaning bar 440 which surrounds a plurality of tines 432. The extender 443a can be up to several inches or more wide, and the extender channel 470a can also be correspondingly wide to accommodate the extender 443a In the previously described embodiments, (e.g., FIG. 5) the extenders 443 extend between the tines 432. In the embodiment with a wider single extender 443a, the extender 443a can be raised so that it can attach to the upper portion of the cleaning bar 440 and does not interfere with the plurality of tines, and does not require an abnormally wide gap between the tines 432 to accommodate the width of the extender 443a. In the embodiment of the rake body 430a shown in FIG. 11 and in previously described embodiments, the channel cover 490 can include all or a portion of the extender channel 442. In an alternative embodiment (not shown), the single extender and the channel for the single extender can be placed on the bottom of the rake body and attached to the bottom of the cleaning bar.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A self-cleaning rake, comprising:
    an elongated handle having a rake end, a handle end and a middle portion;

a body having a surface substantially lying in one plane and having an attachment end that is attached to the rake end of the handle, a tine end opposite the attachment end and a central portion disposed between the attachment end and the tine end;

a plurality of tines extending from and fixed to the tine end of the body;

an actuator bar channel formed in the central portion of the body comprising a pair of major sides and a pair of minor sides;

an actuator bar disposed within the actuator bar channel and extending generally parallel to the tine end of the body;

a grip disposed about the outside of the middle portion of the handle and adapted to slide along the handle;

a push-rod having first and second ends, the push-rod disposed along the handle and connected to the grip and to the actuator bar;

a cleaning bar disposed along the tine end of the body and having a plurality of channels, each of which is adapted to surround at least a portion of a respective one of the tines;

a first extender channel formed in the body and extending from the actuator channel to the tine end of the body; and a first extender connected to the actuator bar and to the cleaning bar;

wherein the actuator bar, the push-rod and the first extender are enclosed within the self-cleaning rake when in a retracted position.

2. The self-cleaning rake of claim 1, further comprising a second extender channel formed in the body and extending from the actuator channel to the tine end of the body and a second extender connecting the actuator bar to the cleaning bar.

3. The self-cleaning rake of claim 1, further comprising a spring configured to bias the first extender in a retracted position.

4. The self-cleaning rake of claim 3, wherein said spring is disposed between said actuator bar and said actuator bar channel such that said spring is stretched when said first extender is in an extended position to bias the first extender in a retracted position.

5. The self-cleaning rake of claim 3, wherein said spring is disposed between said actuator bar and said actuator bar channel such that said spring is compressed when said first extender is in an extended position to bias the first extender in a retracted position.

6. The self-cleaning rake of claim 5, wherein said spring is disposed between the bottom of said actuator bar and the actuator bar channel.

7. The self-cleaning rake of claim 6, wherein said actuator bar comprises a recessed portion configured such that said spring contacts said actuator bar in said recessed portion.

8. The self-cleaning rake of claim 6, wherein said actuator bar channel comprises a recessed portion configured such that said spring contacts said actuator bar channel in said recessed portion.

9. The self-cleaning rake of claim 1, wherein the grip, the actuator bar channel and the extenders are adapted to move at least a leading edge of the cleaning bar to a distal end of each of the tines.

10. The self-cleaning rake of claim 1, wherein the actuator bar channel comprises a pair of major sides and a pair of minor sides, said sides being disposed such that the pair of major sides are generally parallel to the tine end of the body.

11. The self-cleaning rake of claim 1, wherein the major sides of the actuator bar channel comprise a pair of non-parallel major sides and a pair of generally parallel minor sides.

12. The self-cleaning rake of claim 1, wherein the cross-sectional area of at least one of the channels in the cleaning bar varies along the length of the channel.

13. The self-cleaning rake of claim 1, wherein the tines are configured such that the distance between the tines remains generally the same during raking and cleaning.

14. The self-cleaning rake of claim 1, wherein the body is adapted to gather debris during raking.

15. The self-cleaning rake of claim 13, wherein the tines are substantially rigid.

16. The self-cleaning rake of claim 1, further comprising a cover adapted to enclose the actuator bar channel and the extender channel.

17. The self-cleaning rake of claim 1, further comprising:

a pair of longitudinal slots formed generally opposite one another in the middle portion of the handle; and a pin disposed within the grip and connected to the push-rod, the pin engaging at least one of the pair of longitudinal slots;

wherein the pin is adapted to move within the slots thereby defining a range of motion of the grip.

18. The self-cleaning rake of claim 14, wherein a length of the pair of minor sides is generally equal to a length of the pair of slots.

19. The self-cleaning rake of claim 1, wherein at least one channel of the cleaning bar is configured such that the bottom of the channel that extends to or beyond the distal end on its respective tine is narrower than the top end of the channel.

20. The self-cleaning rake of claim 1, wherein the actuator bar, extender and the cleaning bar are fabricated as one piece.

21. The self-cleaning rake of claim 1, wherein the push-rod, actuator bar, extender and the cleaning bar are fabricated as one piece.

22. A self-cleaning rake body for use with a rake handle and actuating push-rod, comprising:

a body having an attachment-end configured for attachment to the handle, the body defining an elongated tine-end opposite the attachment end and a central actuation portion disposed between the attachment-end and the tine-end;

a plurality of tines extending from the tine-end of the body;

an elongated actuator bar enclosed within the actuation portion and extending generally parallel to the tine-end of the body, said actuator bar being adapted to engage the push-rod; and an elongated cleaning bar that is operably attached to the actuator bar and is disposed along the tine-end of the body, said cleaning bar having a plurality of cleaning channels, each of which is adapted to at least partially surround a portion of a respective one of the tines;

wherein the cleaning channels extend a distance of at least one quarter of an inch along the tines and have a cross-sectional area that is larger than a cross-sectional area of the tines, and wherein the cleaning bar is adapted to extend to a distal end of the tines.

23. The rake body of claim 22, wherein the actuator bar is operably attached to the cleaning bar by flexible extenders.

24. The rake body of claim 23, wherein the extenders comprise cables.

25. The rake body of claim 23, wherein the extenders comprise elongated bands.

26. The rake body of claim 25, wherein the extenders further comprise a composite material.

27. A self-cleaning rake, comprising:
an elongated handle having a longitudinal axis;
a body;
a plurality of tines extending from the body;
a push-rod connected to the handle and extending to the body;
a push-rod actuator connected to said push-rod and adapted to extend and retrieve the push-rod along the longitudinal axis of the handle;
an actuator bar slidingly attached to the body and connected to the push-rod such that the push-rod can transmit force from the push-rod actuator to the actuator bar;
a first extender having a first end attached to the actuator bar and a second end; and
a cleaning bar connected to the second end of the first extender, the cleaning bar having a plurality of cleaning channels, one for each tine, wherein at least a portion of each of the cleaning channels has a shape and a size that corresponds to a shape and a size of a portion of a respective one of the tines.

28. The rake of claim 27, further comprising a second extender having a first end attached to the actuator bar and a second end connected to the cleaning bar.

29. The rake of claim 28, wherein the channels extend a distance of at least ¼ of an inch along the tines, and wherein the size of at least one of the tines varies along its length.

30. The rake of claim 28, further comprising two extender channels adapted to redirect the extenders from a direction parallel to the handle to a substantially different direction parallel to the tines.

31. The rake of claim 30, wherein the extender channels are formed by tubes that are affixed to the body.

32. The rake of claim 30, wherein the body is a generally planar object and the at least two extender channels are formed in the body.

33. The rake of claim 30, wherein the cleaning channels extend a length of at least one inch.

34. The rake of claim 30, wherein the cleaning channels extend a length of at least 1-½ inches.

35. The rake of claim 30, wherein substantially all of the body is formed by injection molding.

36. The rake of claim 33, wherein the actuator bar, the push-rod and the push-rod actuator are spring biased to an at-rest position.

37. A method of manufacturing a rake, comprising:
forming a rake body with an attachment end, a tine-end that is wider than the attachment end and a central portion;
attaching a tubular handle to the attachment end of the body;
housing a plurality of tines within the tine-end of the body wherein the tines extend from the body in a direction that is not parallel with the handle;
forming a plurality of channels in the central portion of the body;
forming an actuator bar in one of the channels, said actuator bar being adapted to slide up and down the body;
substantially surrounding the tines with a cleaning bar located along the tine-end of the body and having a plurality of channels, at least one channel for each tine, the cleaning bar being adapted to move along the length of the tines; and
connecting at least one extender to the actuator bar and to the cleaning bar, said at least one extender having first and second ends, and said at least one extender being adapted to connect at the first end to the actuator bar and to connect at the second end to the cleaning bar.

38. The method of claim 37, further comprising enclosing the plurality of channels of the body with a cover adapted to engage the body and at least partially encapsulate the extenders and the actuator bar.

39. A system for manufacturing a rake, comprising:
means for forming a rake body with an attachment end, a tine-end that is wider than the attachment end and a central portion;
means for attaching an elongated tubular handle to the attachment end of the body;
means for housing a plurality of tines within the tine-end of the body wherein the tines extend from the body in a direction that is not parallel with the handle;
means for forming a plurality of channels in the central portion of the body;
means for forming an actuator bar in one of the channels that is adapted to slide up and down the body;
means for substantially surrounding the tines with a cleaning bar located along the tine-end of the body and having a plurality of channels, at least one channel for each tine, the cleaning bar being adapted to move along the length of the tines; and
means for connecting at least one extender to the actuator bar and to the cleaning bar, each of the at least one extender having first and second ends, and each of the at least one extender being adapted to connect at the first end to the actuator bar and to connect at the second end to the cleaning bar.

40. The system of claim 39, further comprising means for enclosing the plurality of channels of the body with a cover adapted to engage the body and at least partially encapsulate the extenders and the actuator bar.

41. A method of cleaning debris from the tines of a rake having a handle connected to a housing with a plurality of tines at one end thereof, comprising:
moving a push-rod along the handle;
moving a cleaning mechanism in response to movement of the push-rod; and
moving a cleaning bar in response to movement of the cleaning mechanism, wherein the cleaning bar includes at least one cleaning channel that substantially surrounds at least one respective tine such that the act of moving the cleaning bar moves the cleaning bar along the at least one tine so as to remove debris located in contact with the at least one tine, and wherein a portion of the at least one cleaning channel extends beyond the end of the at least one tine during a portion of the movement of the cleaning bar along the at least one tine.

42. A self-cleaning rake having a handle connected to a housing with a plurality of tines at one end thereof, comprising:
means for moving a push-rod along the handle;
means for moving a cleaning mechanism in response to movement of the push-rod; and
means for moving a cleaning bar in response to movement of the cleaning mechanism, wherein the cleaning bar includes at least one cleaning channel that substantially surrounds at least one respective tine such that the act of moving the cleaning bar moves the cleaning bar along the at least one tine so as to remove debris located in contact with the at least one tine, and wherein a portion of the at least one cleaning channel extends beyond the end of the at least one tine during a portion of the movement of the cleaning bar along the at least one tine.

43. A self-cleaning rake, comprising:

a handle;

a body attached to the handle, the body comprising a cleaning mechanism;

a plurality of tines attached to the body; and a cleaning member connected to the cleaning mechanism, said cleaning member associated with at least one of the plurality of tines, wherein said cleaning member surrounds said associated tine and travels along at least a portion of said associated tine to a location at least adjacent to the distal end of said associated tine so as to remove material located on said associated tine.

44. The self-cleaning rake of claim 43, wherein the cleaning member travels along at least a portion of said associated tine to a location beyond the distal the end of said associated tine.

* * * * *